US010139926B2

(12) United States Patent
Murauyou et al.

(10) Patent No.: US 10,139,926 B2
(45) Date of Patent: Nov. 27, 2018

(54) MAGNETIC RETENTION OF PERIPHERAL DEVICE FOR A TABLET COMPUTER

(71) Applicant: NVIDIA Corporation, Santa Clara, CA (US)

(72) Inventors: Sergey Murauyou, Santa Clara, CA (US); Nelson Au, Foster City, CA (US); Glenn Wernig, San Jose, CA (US); Don Miller, Manteca, CA (US); Mark Johnson, Felton, CA (US); Tommy Lee, Danville, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 18 days.

(21) Appl. No.: 14/967,147

(22) Filed: Dec. 11, 2015

(65) Prior Publication Data

US 2017/0168598 A1 Jun. 15, 2017

(51) Int. Cl.
*G06F 3/03* (2006.01)
*G06F 3/0354* (2013.01)
*G06F 1/16* (2006.01)

(52) U.S. Cl.
CPC ........ *G06F 3/03545* (2013.01); *G06F 1/1626* (2013.01); *G06F 2200/1632* (2013.01)

(58) Field of Classification Search
None
See application file for complete search history.

(56) References Cited

U.S. PATENT DOCUMENTS

| | | | | |
|---|---|---|---|---|
| 4,643,604 A * | 2/1987 | Enrico | ................... | B43K 29/00 206/371 |
| 9,112,303 B2 * | 8/2015 | Zeliff | ................. | H01R 13/6205 |
| 9,507,381 B1 * | 11/2016 | Vanderet | .............. | G06F 1/1656 |
| 2002/0190823 A1 * | 12/2002 | Yap | ........................ | G06F 1/1616 335/205 |
| 2004/0109285 A1 * | 6/2004 | Lee | ....................... | G06F 1/1626 361/679.3 |
| 2009/0128521 A1 * | 5/2009 | Chen | ..................... | G06F 1/1626 345/179 |
| 2010/0173676 A1 * | 7/2010 | Zhou | .................... | H04M 1/0214 455/566 |
| 2010/0265176 A1 * | 10/2010 | Olsson | ...................... | G05G 5/05 345/161 |
| 2011/0090668 A1 * | 4/2011 | Lin | ........................ | B43K 29/10 362/84 |
| 2013/0162589 A1 * | 6/2013 | Lien | ........................ | G06F 3/046 345/174 |

(Continued)

*Primary Examiner* — Binh Tran
*Assistant Examiner* — Douglas Burtner
(74) *Attorney, Agent, or Firm* — Artegis Law Group, LLP

(57) ABSTRACT

A peripheral device for a computing device comprises a body configured for insertion into a storage cavity in the computing device, a first magnet, and a second magnet. The first magnet is disposed within the body proximate a first external surface of the body and having a first pole of a first polarity and a second pole of a second polarity, wherein the first pole is oriented toward the first external surface. The second magnet is disposed within the body between a second external surface and the first magnet and having a first pole of the first polarity and a second pole of the second polarity, wherein the first pole of the second magnet is oriented toward the second external surface.

20 Claims, 6 Drawing Sheets

FIG. 3

(56) References Cited

U.S. PATENT DOCUMENTS

| | | | | |
|---|---|---|---|---|
| 2013/0264902 A1* | 10/2013 | Wilson | .................... | H02K 7/06 |
| | | | | 310/80 |
| 2013/0274577 A1* | 10/2013 | Amirouche | ......... | A61M 5/1723 |
| | | | | 600/365 |
| 2014/0165742 A1* | 6/2014 | Fergusson | ........... | G06F 3/03545 |
| | | | | 73/862.68 |
| 2014/0292730 A1* | 10/2014 | Yoon | ................... | G06F 3/03545 |
| | | | | 345/179 |
| 2015/0156290 A1* | 6/2015 | Amit | .................... | H04M 1/026 |
| | | | | 345/179 |
| 2016/0034054 A1* | 2/2016 | Utykanski | ........... | G06F 3/03545 |
| | | | | 235/462.13 |
| 2016/0034055 A1* | 2/2016 | Utykanski | ............ | G06F 3/03545 |
| | | | | 235/462.13 |
| 2016/0190736 A1* | 6/2016 | Chun | ................ | H01R 13/6205 |
| | | | | 439/39 |
| 2016/0216783 A1* | 7/2016 | Nicholson | ........... | G06F 3/03545 |

\* cited by examiner

MAGNETIC RETENTION OF PERIPHERAL DEVICE FOR A TABLET COMPUTER

BACKGROUND OF THE INVENTION

Field of the Invention

The present invention relates generally to integrated circuit (IC) design and, more specifically, to magnetic retention of peripheral device for an electronic tablet.

Description of the Related Art

Electronic tablets, also referred to as table computers, are configured with touch screens for user input. Often, in lieu of a mouse or trackpad, a stylus or stylus pen can be used as a pointing device to facilitate user inputs via the touch screen, since touch gestures on a touch screen may lack adequate precision, particularly when the touch screen is relatively small.

For convenience, the stylus for an electronic tablet is typically secured inside or on the tablet when not in use, such as via a mechanism that mechanically engages the stylus and holds the stylus in place in some way. For example, a mechanical snap or spring-loaded ball-bearing or hook may be employed to retain the stylus when not in use. However, over time, such mechanisms wear out or fail, often after a relatively low number of use cycles. For example, a mechanical snap located within a tablet computer for retaining a stylus and/or the mating edge formed on the stylus may wear down to a point at which the stylus falls out of the tablet merely from gravitational forces. Due to the materials and small dimensions associated with such a retaining mechanism, this level of wear may occur after only a few thousand use cycles. Worse, the gradual failure associated with incremental wear can be difficult to detect by a user, until the stylus has fallen out of the tablet computer and is lost.

As the foregoing illustrates, what would be useful is more effective way to retain a stylus or other peripheral device for a tablet computer.

SUMMARY OF THE INVENTION

One embodiment of the present invention sets forth a peripheral device for a computing device that comprises a body configured for insertion into a storage cavity in the computing device, a first magnet, and a second magnet. The first magnet is disposed within the body proximate a first external surface of the body and having a first pole of a first polarity and a second pole of a second polarity, wherein the first pole is oriented toward the first external surface. The second magnet is disposed within the body between a second external surface and the first magnet and having a first pole of the first polarity and a second pole of the second polarity, wherein the first pole of the second magnet is oriented toward the second external surface.

At least one advantage of the disclosed embodiments is that a peripheral device for a tablet computer, such as a stylus pen, can be magnetically secured within the tablet computer without any sort of mechanical retention device that is subject to wear and/or mechanical failure.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION OF EXEMPLARY EMBODIMENTS

In the following description, numerous specific details are set forth to provide a more thorough understanding of the present invention. However, it will be apparent to one of skill in the art that the present invention may be practiced without one or more of these specific details.

Figure 1:
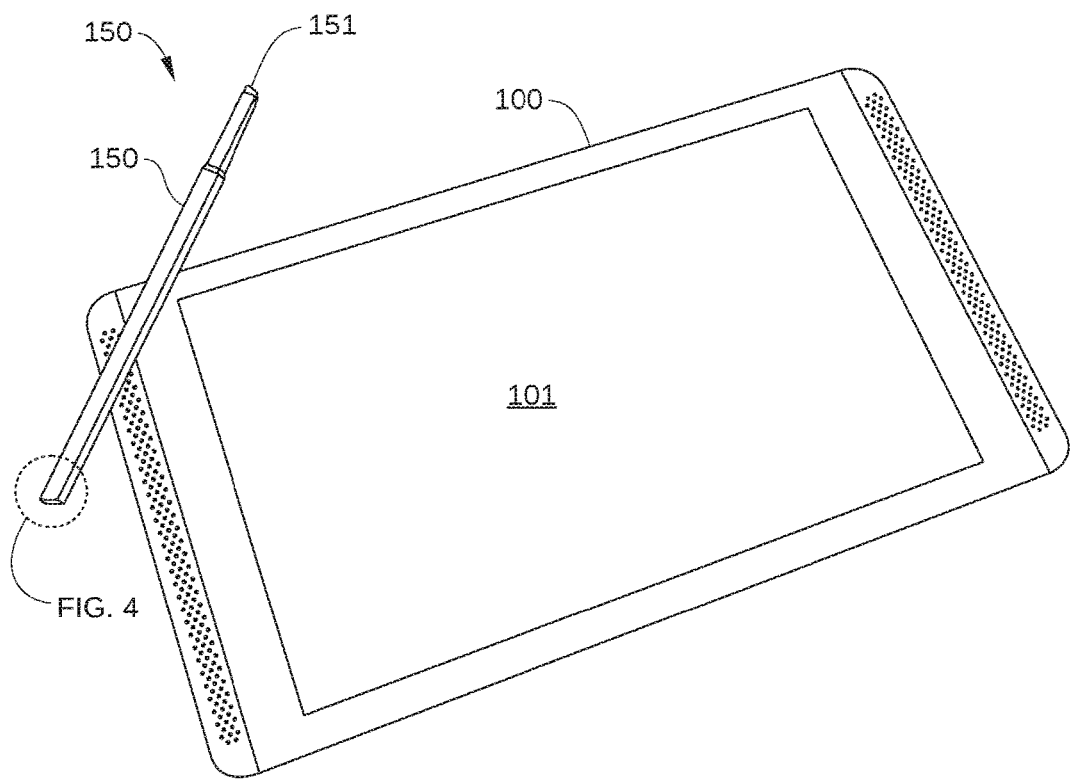
FIG. 1 is a perspective diagram illustrating a tablet computer and an associated peripheral device that can be stored within the tablet computer, according to one or more aspects of the present invention.

FIG. 1 is a perspective diagram illustrating a tablet computer 100 and an associated peripheral device 150 that can be stored within tablet computer 100, according to one or more aspects of the present invention. Tablet computer 100 may be any computing device that includes a touchscreen 101 and is configurable for use with one or more peripheral devices, such as peripheral device 150. For example, tablet computer 100 may be a personal digital assistant (PDA), a smartphone, an electronic tablet, or a hand-held video game player. Peripheral device 150 may be any auxiliary device associated with tablet computer that is generally carried with tablet computer 100 and is sufficiently small to be secured in a storage cavity of tablet computer 100. For example, peripheral device 150 may be a stylus pen for entering inputs via touchscreen 101, a collapsible stand for adjusting the position of tablet computer 100 when disposed on a desktop, and the like. In the embodiment illustrated in FIG. 1, peripheral device 150 is depicted as a stylus pen, which enables more precise control of handwriting, drawing, and touchscreen games than finger gestures or touch-inputs on touchscreen 101. In such embodiments, peripheral device 150 includes an input tip 151 on one end for making such inputs on touchscreen 101.

Figure 2:
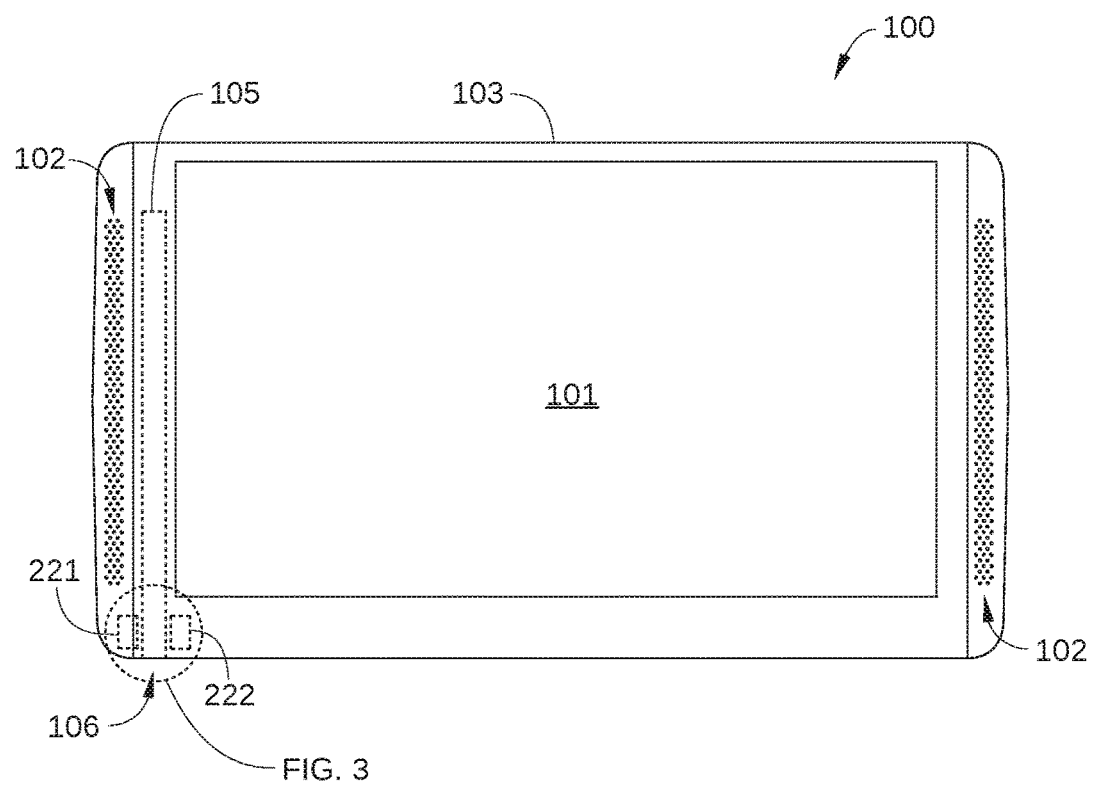
FIG. 2 is a schematic plan view of the tablet computer of FIG. 1, according to one or more embodiments of the present invention.

FIG. 2 is a schematic plan view of tablet computer 100, according to one or more embodiments of the present invention. As shown, tablet computer 100 includes, without limitation, a housing 103, touchscreen 101, which is disposed on a major surface of housing 103, one or more speakers 102 contained within housing 103, and a storage cavity 105 formed inside housing 103. Touchscreen 101 displays video and still image output, and may be any touch-sensitive or gesture-sensitive screen that is configurable for receiving user inputs via a stylus pen, such as peripheral device 150. Speakers 102 produce audio output, for example audio output that corresponds with video output displayed by touchscreen 101. Storage cavity 105 is an storage volume configured to stow peripheral device 150, and includes an insertion opening 106 disposed on an outer surface of housing 103 for insertion of peripheral device 150.

Although not explicitly shown in FIGS. 1 and 2, tablet computer 100 may also include other components, such as a central processing unit (CPU), a graphics processing unit (GPU), and/or some other processor, volatile memory, such as random-access memory (RAM), and non-volatile storage, such as fixed or removable hard disk drives and/or flash memory devices. Table computer 100 may further include one or more universal serial bus or other port connections, compact disc drives, digital versatile disc drives, film recording devices, and the like.

Disposed in housing 103 and proximate storage cavity 105 are a first housing magnet 221 and a second housing magnet 222. First housing magnet 221 and second housing magnet 222 can be any suitable magnetic material, and are configured to provide sufficient magnetic retaining force on corresponding magnets (described below in conjunction with FIG. 4) disposed in peripheral device 150 to secure peripheral device 150 inside storage cavity 105. Thus, no mechanical snap, hook, or other mechanism subject to wear is needed for peripheral device 150 to be retained securely in storage cavity 105.

The precise dimensions and locations of first housing magnet 221 and second housing magnet 222 that produce sufficient magnetic retaining force on the magnets in peripheral device 150 to securely retain peripheral device 150 depend on a plurality of factors, including the mass of peripheral device 150, since the magnetic retaining force should prevent peripheral device 150 from falling out of storage cavity 105 regardless of the orientation of tablet computer 100. Other such factors include the magnetic field generated by the corresponding magnets disposed in peripheral device 150, as well as the size and proximity of these corresponding magnets. In some embodiments, the maximum magnitude of the magnetic field strength of first housing magnet 221 and second housing magnet 222 may be limited by the magnitude of magnetic field that can be tolerated by one or more electronic components of tablet computer 100. A configuration of first housing magnet 221 and second housing magnet 222, according to one embodiment, is illustrated in FIG. 3.

Figure 3:
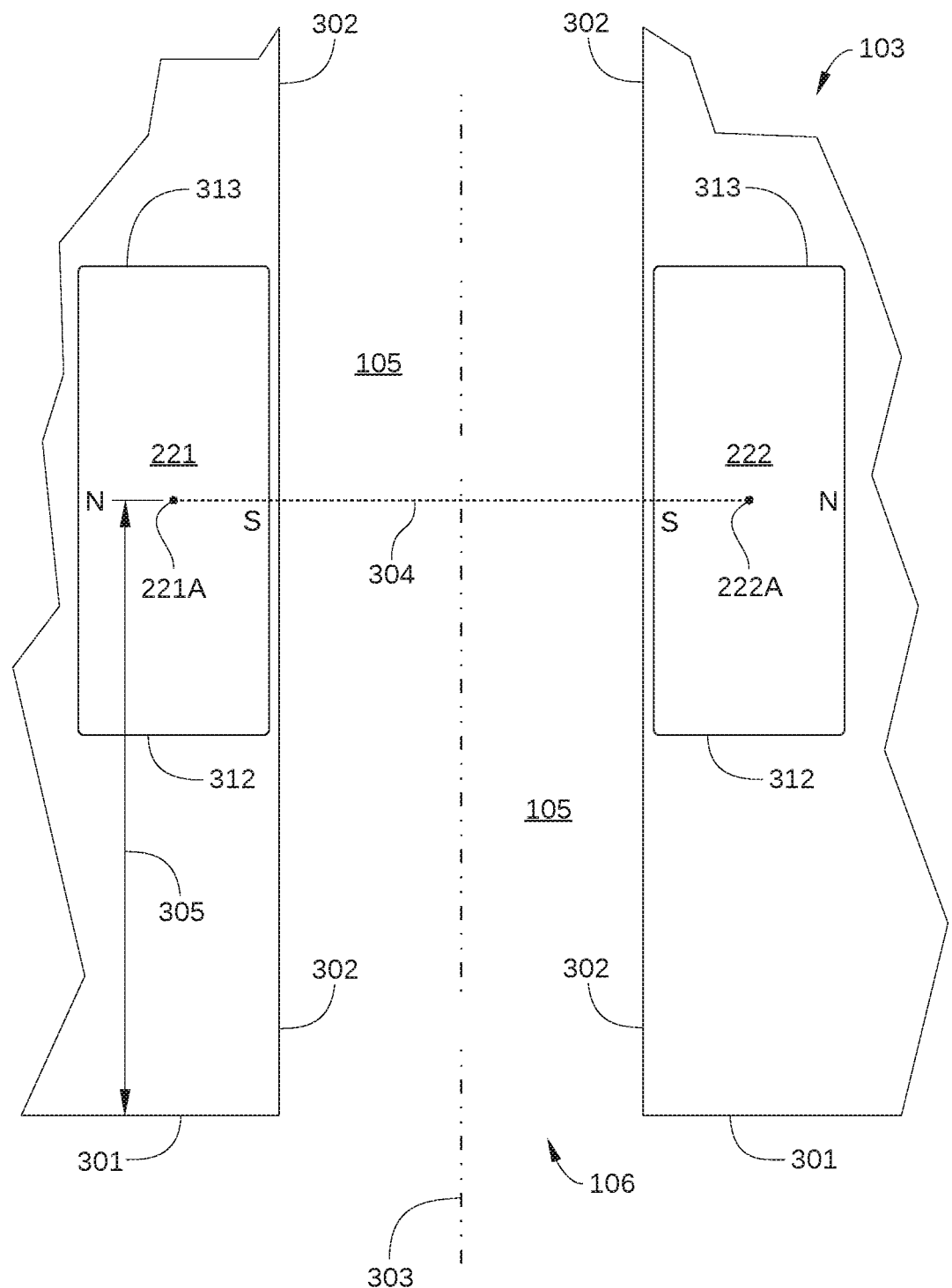
FIG. 3 is a more detailed view of the portion of the housing of the tablet computer indicated in FIG. 2, according to one or more embodiments of the present invention.

FIG. 3 is a more detailed view of a portion of housing 103 indicated in FIG. 2, according to one embodiment of the present invention. As shown, housing 103 includes external surfaces 301, and storage cavity 105 includes surfaces 302 and insertion opening 106, which is formed in one of external surfaces 301. In addition, first housing magnet 221 and second housing magnet 222 are located proximate insertion opening 106, and are on substantially opposite sides of storage cavity 105. In the embodiment illustrated in FIG. 3, first housing magnet 221 and second housing magnet 222 are positioned symmetrically about a centerline 303 of storage cavity 105, but in other embodiments, first housing magnet 221 and second housing magnet 222 may not be positioned with such symmetry. Similarly, in the embodiment illustrated in FIG. 3, first housing magnet 221 and second housing magnet 222 are aligned with each other so that a line 304 between a center point 221A of first housing magnet 221 and a center point 222A of second housing magnet 222 is substantially perpendicular to centerline 303. In other embodiments, center point 221A center point 222A are not necessarily so aligned.

First housing magnet 221 and second housing magnet 222 are each located a displacement 305 from insertion opening 106. Displacement 305 is selected so that, when peripheral device 150 is stowed in storage cavity 105, at least a portion of first housing magnet 221 and a portion of second housing magnet 222 each overlap at least a portion of corresponding magnets (described below) disposed within peripheral device 150. In some embodiments, displacement 305 is selected so that, when peripheral device 150 is stowed in storage cavity 105, center point 221A of first housing magnet 221 and center point 222A of second housing magnet 222 each overlap at least a portion of corresponding magnets disposed within peripheral device 150. In some embodiments, displacement 305 has the same value for first housing magnet 221 and for second housing magnet 222, whereas in other embodiments, displacement 305 may have one value for first housing magnet 221 and a different value for second housing magnet 222.

Displacement 305 of first housing magnet 221 and second housing magnet 222 from insertion opening 106 may be defined in terms of center points 221A and 222A, as shown in FIG. 3, or in terms of any other reference point on first housing magnet 221 and second housing magnet 222. For example, displacement 305 may be defined in terms of a nearest edge 312 of first housing magnet 221 and second housing magnet 222 to insertion opening 106, a distal edge 313 of first housing magnet 221 and second housing magnet 222 to insertion opening 106, etc.

First housing magnet 221 and second housing magnet 222 each have a north pole (denoted "N") and a south pole (denoted "S"). According to embodiments of the present invention, one of the poles of first housing magnet 221 is oriented substantially toward storage cavity 105, and one of the poles of second housing magnet 222 is oriented substantially toward storage cavity 105. Furthermore, in some embodiments, polarity of the pole of first housing magnet 221 that is oriented toward storage cavity 105 is the same polarity as the pole of second housing magnet 222 that is oriented toward storage cavity 105. For example, in the embodiment illustrated in FIG. 3, the south pole S of first housing magnet 221 and the south pole S of second housing magnet 222 are both oriented toward storage cavity 105. In such embodiments, when corresponding magnets disposed within peripheral device 150 each have a north pole oriented outward toward first housing magnet 221 and second housing magnet 222, a retaining force is exerted on peripheral device 150 when peripheral device 150 is inserted into storage cavity 105. It is noted that in such embodiments, the retaining force is exerted on peripheral device 150 regardless of the orientation of peripheral device 150 about centerline 303, as described in greater detail below in conjunction with FIG. 5.

Figure 4:
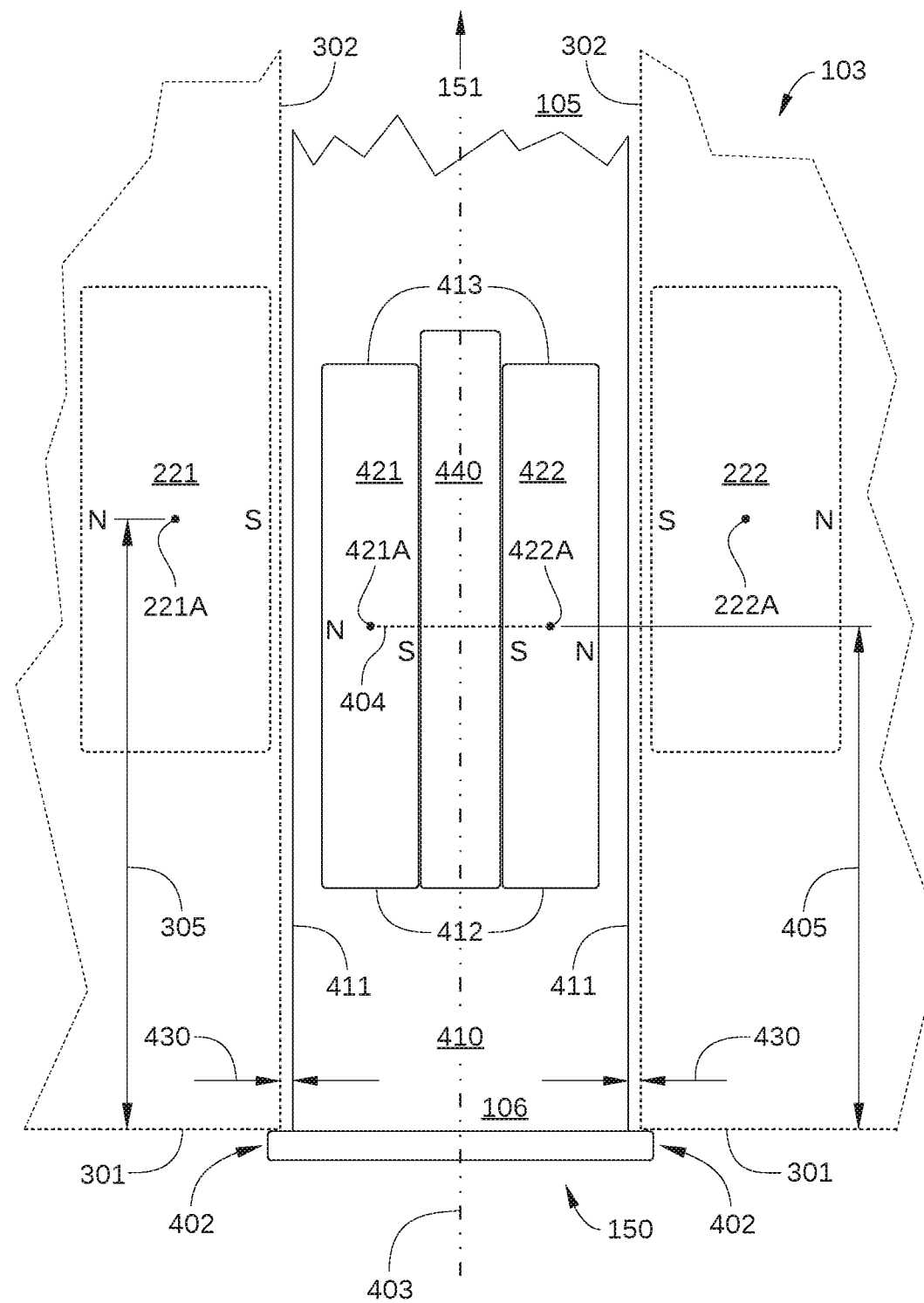
FIG. 4 is a more detailed view of the portion of the peripheral indicated in FIG. 1, according to one or more embodiments of the present invention.

FIG. 4 is a schematic illustration of a portion of peripheral device 150 indicated in FIG. 1, according to one embodiment. For reference, external surfaces 301 of housing 103, surfaces 302 of storage cavity 105, first housing magnet 221, and second housing magnet 222 are also indicated (dashed lines) in FIG. 4. As shown, peripheral device 150 includes a body 410 configured for insertion into storage cavity 105, a first body magnet 421 that is disposed within body 410, a second body magnet 422 that is disposed within body 410 and proximate first body magnet 221, and, in some embodiments, a removal tab 402 disposed on an end of body 410 that is opposite input tip 151 of peripheral device 150.

First body magnet 421 and second body magnet 422 can be any suitable magnetic material, and are configured to provide sufficient magnetic retaining force on corresponding magnets disposed in peripheral device 150 (i.e., first housing magnet 221 and second housing magnet 222) to secure peripheral device 150 inside storage cavity 105. Due to the magnetic retaining force between first body magnet 421 and first housing magnet 221, and between second body magnet 422 and second housing magnet 222, no mechanical snap, hook, or other mechanism is needed for peripheral device 150 to be retained securely in storage cavity 105. In addition, because no mechanical apparatus retains peripheral device 150 through contact with some feature on body 410, no contact is required between body 410 and any mechanical apparatus disposed in storage cavity 150. Consequently, body 410 can be configured so that a clearance 430 is present between external surfaces 411 of body 410 and surfaces 302 of storage cavity 105, thereby preventing scratching of external surfaces 411.

The precise dimensions and locations of first body magnet 421 and second body magnet 422 that produce sufficient magnetic retaining force on first housing magnet 221 and second housing magnet 222 to securely retain peripheral device 150 depend on a plurality of factors, as described above. One of ordinary skill in the art, upon reading the disclosure provided herein, can readily determine an appropriate configuration and placement of first body magnet 421 and second body magnet 422 to produce sufficient magnetic retaining force to securely retain peripheral device 150 in storage cavity 105. In some embodiments, the maximum magnitude of the magnetic field strength of first body magnet 421 and second body magnet 422 may be limited by the magnitude of magnetic field that can be tolerated by one or more electronic components of tablet computer 100.

In general, first body magnet 421 and second body magnet 422 are each disposed within body 410 proximate a respective external surface 411 of body 410. Furthermore, first body magnet 421 and second body magnet 422 are positioned within body 410 to correspond to the locations of first housing magnet 221 and second housing magnet 222, respectively, when peripheral device 150 is inserted in storage cavity 105. For example, in the embodiment illustrated in FIG. 4, first body magnet 421 and second body magnet 422 are each disposed on substantially opposite sides of body 410, so that first body magnet 421 is disposed proximate first housing magnet 221 and second body magnet 422 is disposed proximate second housing magnet 222. Thus, in the embodiment illustrated in FIG. 4, first body magnet 421 and second body magnet 422 are positioned symmetrically about a centerline 403 of body 410. However, in other embodiments, first body magnet 421 and second body magnet 422 may not be positioned with such symmetry. Similarly, in the embodiment illustrated in FIG. 4, first body magnet 421 and second body magnet 422 are aligned with each other so that a line 404 between a center point 421A of first body magnet 421 and a center point 422A of second body magnet 422 is substantially perpendicular to centerline 403. In other embodiments, center point 421A center point 422A are not necessarily so aligned.

First body magnet 421 and second body magnet 422 are each located a displacement 405 from insertion opening 106. Displacement 405 is selected so that, when peripheral device 150 is stowed in storage cavity 105, at least a portion of first body magnet 421 and a portion of second body magnet 422 each overlap at least a portion of a corresponding magnet disposed within peripheral device 150, e.g., first housing magnet 221 and second housing magnet 222. In some embodiments, displacement 405 is selected so that, when peripheral device 150 is stowed in storage cavity 105, center point 421A of first body magnet 421 and center point 422A of second body magnet 422 each overlap at least a portion of corresponding magnets disposed within peripheral device 150. In some embodiments, displacement 405 has the same value for first body magnet 421 and for second body magnet 422, whereas in other embodiments, displacement 405 may have one value for first body magnet 421 and a different value for second body magnet 422. In some embodiments, the value of displacement 405 may be selected to position first body magnet 421 and second body magnet 422 away from magnetic-field sensitive components of tablet computer 100.

First body magnet 421 and second body magnet 422 each have a north pole (denoted "N") and a south pole (denoted "S"). According to embodiments of the present invention, one of the poles of first body magnet 421 is oriented substantially toward one of external surfaces 411 of body 410, and one of the poles of second body magnet 422 is oriented substantially toward a different external surface 411 of body 410. Furthermore, in some embodiments, polarity of the pole of first body magnet 421 that is oriented toward storage cavity 105 is the same polarity as the pole of second body magnet 422 that is oriented toward storage cavity 105. For example, in the embodiment illustrated in FIG. 4, the north pole N of first body magnet 421 and the north pole N of second body magnet 422 are both oriented toward storage cavity 105. Thus, the south poles S of first body magnet 421 and second body magnet 422 are each oriented toward each other. In such embodiments, when first housing magnet 221 and second housing magnet 222 each have a south pole oriented toward first body magnet 421 and second body magnet 422, a retaining force is exerted on peripheral device 150 when peripheral device 150 is inserted into storage cavity 105. It is noted that in such embodiments, the retaining force is exerted on peripheral device 150 regardless of the orientation of peripheral device 150 about centerline 303, as described in greater detail below in conjunction with FIG. 5.

In some embodiments, when peripheral device 150 is stowed in storage cavity 105, center points 221A and 222A are located a greater distance from insertion opening 106 than center points 421A and 422A. That is, displacement 305 is greater than displacement 405, and line 304 is farther from insertion opening 106 than line 404. In such embodiments, a constant retaining force is exerted against removal tab 402 that holds peripheral device 150 in place, thereby reducing or eliminating rattling or vibration of peripheral device 150 when stowed in storage cavity 105.

In some embodiments, peripheral device 150 includes a spacer element 440 disposed between first body magnet 421 and second body magnet 422. In such embodiments, spacer element 440 is in contact with the pole of first body magnet 421 that is oriented toward second body magnet 422 (i.e., the south pole S of first body magnet 421) and the pole of second body magnet 422 that is oriented toward first body magnet 421 (i.e., the south pole S of second body magnet 422). Due to the high repulsive force that may be generated between the respective south poles of first body magnet 421 and second body magnet 422, spacer element 440 can significantly facilitate assembly of peripheral device 150.

In the embodiment illustrated in FIG. 4, first housing magnet 221, second housing magnet 222, first body magnet 421, and second body magnet 422 are disposed proximate insertion opening 106. However, in other embodiments, first housing magnet 221, second housing magnet 222, first body magnet 421, and second body magnet 422 may be disposed at any technically feasible location along centerline 403.

Figure 5:
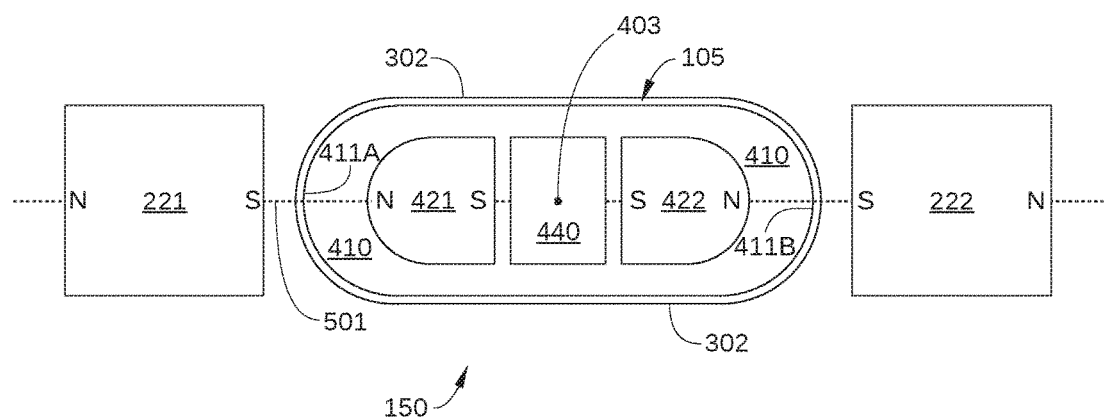
FIG. 5 is a schematic edge view of the peripheral device of FIG. 1 stowed in a storage cavity of a tablet computer, according to one or more embodiments of the present invention.

FIG. 5 is a schematic edge view of peripheral device 150 stowed in storage cavity 105, according to one embodiment of the present invention. FIG. 5 illustrates the relative positions of first housing magnet 221, second housing magnet 222, first body magnet 421, and second body magnet 422 when peripheral device 150 is stowed in storage cavity 105. In addition, FIG. 5 illustrates one orientation of the north and south poles of the above magnets. The view of peripheral device 150 illustrated in FIG. 5 is along a line of sight parallel to centerline 403 of body 410, consequently centerline 403 is depicted as a point.

As shown, north pole N of first body magnet 421 is oriented toward an external surface 411A of body 410, while north pole N of second body magnet 422 is oriented toward an external surface 411B of body 410. In addition, south pole S of first housing magnet 221 is oriented toward storage cavity 105 and first body magnet 421. Similarly, south pole S of second housing magnet 222 is oriented toward storage cavity 105 and second body magnet 422. Consequently, there is a magnetic attraction between the opposing poles of the housing magnets and the body magnets when peripheral device 150 is inserted in storage cavity 105. In fact, peripheral device 150 is generally pulled into storage cavity 105 by the retaining force, and does not require any sort of minimum insertion force to be secured in storage cavity 105. It is noted that the absence of such a minimum insertion force is entirely unlike mechanical hooks or snaps, which generally do not engage a mating feature unless peripheral device is inserted completely into storage cavity 105 by a user, and with at least a minimum insertion force.

In the embodiment illustrated in FIG. 5, first body magnet 421 and second body magnet 422 are positioned symmetrically about centerline 403, so that external surface 411A and external surface 411B are disposed on opposing sides of ends of body 410. Because of this symmetrical configuration about centerline 403, and because the same pole of first body magnet 421 and second body magnet 422 (in this embodiment, the north pole) is oriented toward an external surface of body 410, a retaining force is exerted on peripheral device 150 regardless of the orientation of peripheral device 150 in storage cavity 105. Thus, peripheral device 150 may be inserted with first body magnet 421 oriented toward first housing magnet 221 or toward second housing magnet 222. In either case, a retaining force is exerted on peripheral device 150 by first housing magnet 221 and second housing magnet 222.

In the embodiment illustrated in FIG. 5, body 410 and the positioning of first body magnet 421 and second body magnet 422 are configured to be symmetrical about centerline 403, which may be considered the primary axis of peripheral device 150. In addition, in some embodiments, body 410 and the positioning of first body magnet 421 and second body magnet 422 may be configured to be symmetrical about a secondary axis 501 as well. Because body 410 is configured to be symmetrical about secondary axis 501, peripheral device 150 can be inserted in storage cavity 105 in either of two orientations: a first orientation, in which first body magnet 421 is oriented toward first housing magnet 221, and a second orientation, in which first body magnet 421 is oriented toward second housing magnet 222. As noted above, in either such orientation, peripheral device 150 is secured in storage cavity 105 with a magnetic retaining force. In other embodiments, peripheral device 150 may be configured to be inserted in more than just two possible orientations. One such embodiment is illustrated in FIG. 6.

Figure 6:
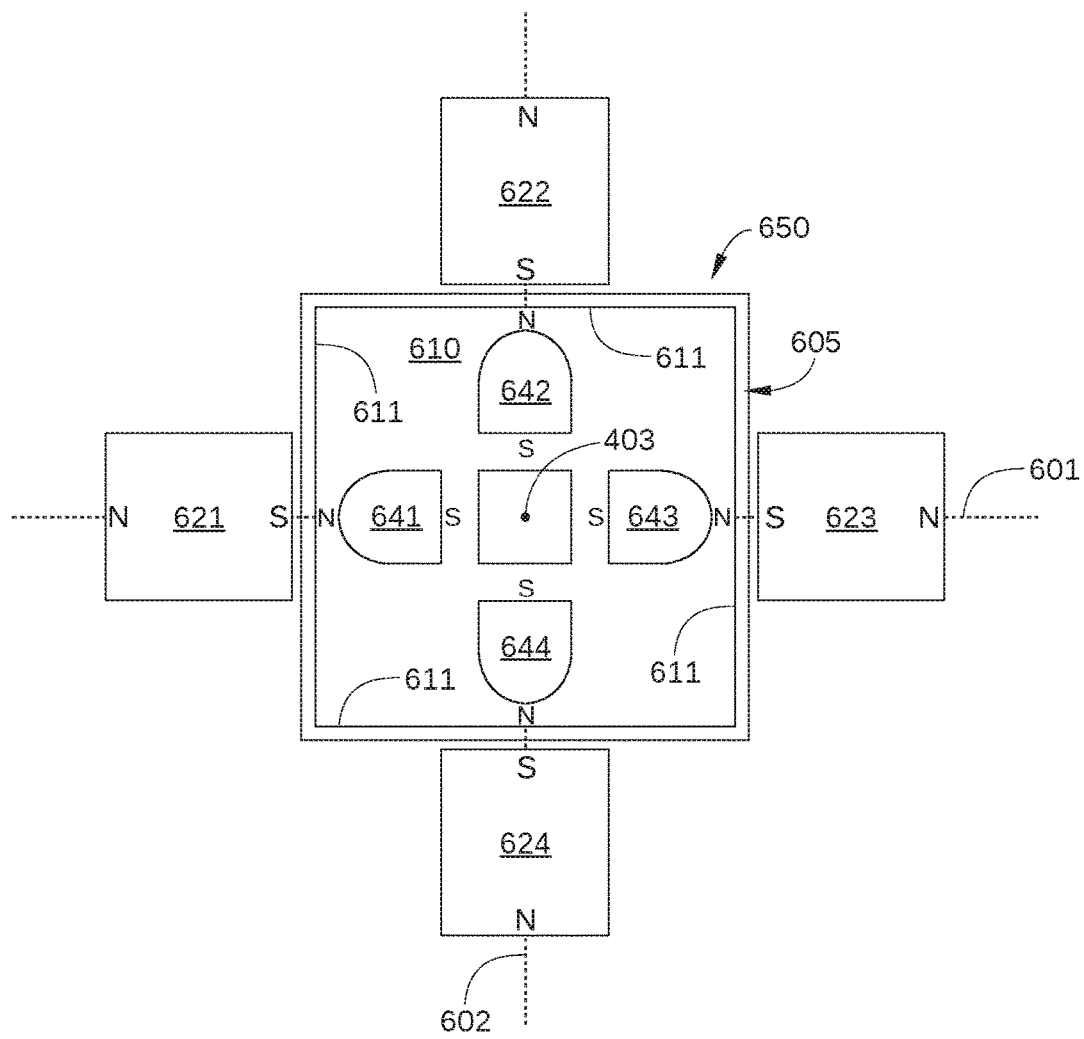
FIG. 6 is a schematic edge view of a peripheral device stowed in a rectangular storage cavity of a tablet computer, according to one or more other embodiments of the present invention.

FIG. 6 is a schematic edge view of a peripheral device 650 stowed in a rectangular storage cavity 605, according to one embodiment of the present invention. FIG. 6 illustrates the relative positions of housing magnets 621-624 and body magnets 641-644 with respect to a body 610 of peripheral device 650. Housing magnets 621-624 may be substantially similar to first housing magnet 221 and second housing magnet 222 in FIG. 2, and body magnets 641-644 may be substantially similar to first body magnet 421 and second body magnet 422 in FIG. 4. Housing magnets 621-624 and body magnets 641-644 are oriented symmetrically about centerline 403, so that housing magnets 621 and 623 and body magnets 641 and 643 are disposed along a secondary axis 601, and housing magnets 622 and 624 and body magnets 642 and 644 are disposed on a secondary axis 602 that is perpendicular to secondary axis 601. Thus, body magnets 641-644 are each disposed proximate a different side of body 610, and are configured so that a pole is oriented toward a respective external surface 611 of body 610 and a respective corresponding housing magnet. As shown, the same pole (in this case the north pole N) for each of body magnets 641-644 is oriented toward the respective external surface 611 and corresponding housing magnet.

Because body 610 is substantially square in cross-section, peripheral device 650 may be inserted into storage cavity 605 in four different orientations. Because the same pole of each of body magnets 641-644 has the same pole (in this case the north pole N) oriented toward an external surface 611 of body 610, and each of housing magnets 621-624 has the same pole of opposite polarity (in this case the south pole S) oriented toward a corresponding one of body magnets 641-644, a retaining force is exerted on peripheral device 650 by housing magnets 621-624 regardless of the orientation in which peripheral device 650 is inserted into storage cavity 605.

An embodiment in which a peripheral device can have two possible insertion orientations and still be secured in a storage cavity in either orientation is illustrated in FIG. 5. Similarly, an embodiment in which a peripheral device can have four possible insertion orientations and still be secured in a storage cavity in each orientation is illustrated in FIG. 6. In yet other embodiments, a peripheral device may have any number possible insertion orientations without exceeding the scope of the invention. For example, a peripheral device may be triangular in cross-section, in which case three different insertion orientations are possible, hexagonal in cross-section, in which six different insertion orientations are possible, and so on. In such embodiments, any suitable number of housing magnets (formed in housing 103) and corresponding body magnets (formed in the peripheral device) may be employed so that the peripheral device may be secured in a storage cavity regardless of insertion orientation. In such embodiments, there may be a one-to-one correspondence between housing magnets and body magnets, as depicted in FIGS. 5 and 6. Alternatively, there may not be such a one-to-one correspondence between body magnets and housing magnets, provided sufficient retaining force is exerted on the peripheral device when stowed in the storage cavity.

In sum, embodiments of the present invention provide systems or the magnetic retention of peripheral device for a tablet computer. Magnets disposed in a body of the peripheral device are configured so that each such magnet has a pole of a first polarity (for example north) oriented toward an external surface of the body and away from the other magnet or magnets in the body. In addition, the magnets disposed in the body are arranged so that the magnetic poles oriented toward an external surface of the body are also oriented toward a corresponding magnet that is disposed in a housing of the tablet computer proximate a storage cavity for the peripheral device. The magnets disposed in the housing are each configured so that a magnetic pole of a second polarity (for example south) is oriented toward a corresponding magnet in the body when the peripheral device is stowed in the storage cavity. Because the magnetic poles of the first polarity are oriented toward the magnetic poles of the second polarity when the peripheral device is inserted into the storage cavity, a magnetic retention force is exerted on the peripheral device that relies on no mechanical retention devices or features.

At least one advantage of the disclosed embodiments is that a peripheral device for a tablet computer, such as a stylus pen, can be magnetically secured within the tablet computer without any sort of mechanical retention device that is subject to wear and/or mechanical failure. Furthermore, since no mechanical wear occurs through removal and insertion of the peripheral device into the storage cavity, the effectiveness of the magnetic retention of the peripheral device in the tablet computer is not reduced over the lifetime of the tablet computer.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system. Accordingly, aspects of the present disclosure may take the form of an entirely hardware embodiment, or an embodiment combining software and hardware aspects that may all generally be referred to herein as a "circuit," "module" or "system." Aspects of the present disclosure are described above with reference to block diagrams of apparatus (systems) according to embodiments of the disclosure. The block diagrams in the figures illustrate the architecture, functionality, and operation of possible implementations of systems according to various embodiments of the present disclosure.

While the preceding is directed to embodiments of the present disclosure, other and further embodiments of the disclosure may be devised without departing from the basic scope thereof, and the scope thereof is determined by the claims that follow.

What is claimed is:

1. A peripheral device for a computing device, the device comprising:
  a body configured for insertion into a storage cavity in the computing device;
  a first magnet disposed within the body proximate a first external surface of the body and having a first pole of a first polarity and a second pole of a second polarity, wherein the first pole is oriented toward the first external surface; and
  a second magnet disposed within the body between a second external surface and the first magnet and having a first pole of the first polarity and a second pole of the second polarity, wherein the first pole of the second magnet is oriented toward the second external surface, wherein the first pole of the first magnet and the first pole of the second magnet are aligned along a first axis that includes a centerline of the body.

2. The peripheral device of claim 1, further comprising a spacer element disposed between the first magnet and the second magnet.

3. The peripheral device of claim 2, wherein the spacer element is in contact with the second pole of the first magnet and the second pole of the second magnet.

4. The peripheral device of claim 1, wherein a line between a center point of the first magnet and a center point of the second magnet is substantially perpendicular to the centerline of the body.

5. The peripheral device of claim 1, wherein the first magnet and the second magnet are positioned symmetrically about the centerline of the body.

6. The peripheral device of claim 5, wherein the first magnet and the second magnet are positioned along the centerline of the body such that, when the peripheral device is inserted into the storage cavity, at least a portion of the first magnet and a portion of the second magnet overlap at least a portion of a third magnet and a portion of a fourth magnet that are disposed within the computing device proximate the storage cavity.

7. The peripheral device of claim 6, wherein the third magnet includes a first pole of the first polarity that is oriented away from the storage cavity and a second pole of the second polarity that is oriented toward the storage cavity.

8. The peripheral device of claim 6, wherein, when the peripheral device is inserted into the storage cavity, a center point of the first magnet is closer to an insertion opening of the storage cavity than a center point of the third magnet.

9. A computing device, comprising:
  a housing with a storage cavity shaped to accommodate a peripheral device;
  a first magnet that is disposed within the housing and proximate a first surface of the storage cavity and has a first pole of a first polarity and a second pole of a second polarity, wherein the first pole is oriented toward the first surface; and
  a second magnet that is disposed within the housing and proximate a second surface of the storage cavity and has a first pole of the first polarity and a second pole of the second polarity, wherein the first pole of the second magnet is oriented toward the second surface and the second surface is parallel to the first surface.

10. The computing device of claim 9, wherein the storage cavity is shaped such that, when the peripheral device is inserted into the storage cavity, there is clearance between an outer surface of the peripheral device and the first surface and the second surface.

11. The computing device of claim 9, wherein the first magnet and the second magnet are positioned symmetrically about a centerline of the storage cavity.

12. The computing device of claim 9, wherein the first magnet and the second magnet are positioned along the centerline of the storage cavity such that, when the peripheral device is inserted into the storage cavity, at least a portion of the first magnet and a portion of the second magnet overlap at least a portion of a third magnet and a portion of a fourth magnet that are disposed within the peripheral device.

13. The computing device of claim 12, wherein the third magnet includes a first pole of the first polarity that is oriented away from the closest external surface of the peripheral device and a second pole of the second polarity that is oriented toward the closest external surface of the peripheral device.

14. The computing device of claim 13, wherein the fourth magnet includes a first pole of the first polarity that is oriented away from the closest external surface of the peripheral device and a second pole of the second polarity that is oriented toward the closest external surface of the peripheral device.

15. The computing device of claim 13, wherein the peripheral device has a shape configured to orient the second pole of the third magnet toward the first pole of the first magnet and the second pole of the fourth magnet toward the first pole of the second magnet.

16. The computing device of claim 9, wherein a line between a center point of the first magnet and a center point of the second magnet is substantially perpendicular to a centerline of the storage cavity.

17. A computing system, comprising:
 a housing with a storage cavity shaped to accommodate a peripheral device, the housing comprising:
  a first magnet that is disposed within the housing and proximate a first surface of the storage cavity and has a first pole of a first polarity and a second pole of a second polarity, wherein the first pole is oriented away from the first surface and the second pole is oriented towards the first surface; and
  a second magnet that is disposed within the housing and proximate a second surface of the storage cavity and has a first pole of the first polarity and a second pole of the second polarity, wherein the first pole of the second magnet is oriented away from the second surface and the second pole is oriented towards the second surface; and
 a peripheral device with a body configured for insertion into the storage cavity, the peripheral device comprising:
  a third magnet disposed within the body proximate a first external surface of the body and having a first pole of the first polarity and the second pole of a second polarity, wherein the first pole is oriented toward the first external surface; and
  a fourth magnet disposed within the body between a second external surface of the body and the third magnet and having a first pole of the first polarity and a second pole of the second polarity, wherein the first pole is oriented toward the second external surface,
 wherein the third magnet and the fourth magnet are positioned along a centerline of the body such that, when the peripheral device is inserted into the storage cavity, at least a portion of the third magnet and a portion of the fourth magnet overlap at least a portion of the first magnet and a portion of the second magnet.

18. The computing system of claim 17, wherein the peripheral device further comprises a spacer element disposed between the third magnet and the fourth magnet.

19. The computing system of claim 17 wherein, when the peripheral device is inserted into the storage cavity, a center point of the third magnet is closer to an insertion opening of the storage cavity than a center point of the first magnet.

20. The computing system of claim 17, wherein the storage cavity is shaped such that, when the peripheral device is inserted into the storage cavity, there is clearance between the first exterior surface of the peripheral device and the first surface and the second surface.

* * * * *